(12) United States Patent
Douglas et al.

(10) Patent No.: US 11,839,970 B2
(45) Date of Patent: Dec. 12, 2023

(54) SYSTEM AND METHOD FOR PREVENTING DEBRIS BUILDUP IN VACUUM SENSOR LINES

(71) Applicant: Material Handling Systems, Inc., Mt. Washington, KY (US)

(72) Inventors: Josiah Douglas, Louisville, KY (US); Paul Receveur, New Albany, IN (US)

(73) Assignee: Material Handling Systems, Inc., Mt. Washington, KY (US)

( * ) Notice: Subject to any disclaimer, the term of this patent is extended or adjusted under 35 U.S.C. 154(b) by 0 days.

(21) Appl. No.: 17/982,868

(22) Filed: Nov. 8, 2022

(65) Prior Publication Data

US 2023/0141674 A1 May 11, 2023

Related U.S. Application Data

(60) Provisional application No. 63/278,295, filed on Nov. 11, 2021.

(51) Int. Cl.
| | |
|---|---|
| *B25J 15/06* | (2006.01) |
| *B01D 46/00* | (2022.01) |
| *B25J 19/00* | (2006.01) |

(52) U.S. Cl.
CPC ...... *B25J 15/0625* (2013.01); *B01D 46/0012* (2013.01); *B25J 19/0066* (2013.01); *B01D 2273/28* (2013.01)

(58) Field of Classification Search
CPC .......................... B25J 15/0625; B25J 15/0658
See application file for complete search history.

(56) References Cited

U.S. PATENT DOCUMENTS

| | | | |
|---|---|---|---|
| 10,646,898 B2 | 5/2020 | Hillerich, Jr. et al. | |
| 10,994,309 B2 | 5/2021 | Hillerich, Jr. et al. | |
| 2019/0084012 A1* | 3/2019 | McCoy, Jr. .......... | B25J 15/0616 |
| 2020/0262069 A1 | 8/2020 | Douglas et al. | |

(Continued)

FOREIGN PATENT DOCUMENTS

| | | |
|---|---|---|
| JP | 2019-010681 A | 1/2019 |
| KR | 10-2014-0101348 A | 8/2014 |

OTHER PUBLICATIONS

Korean Intellectual Property Office, International Search Report and Written Opinion issued in corresponding Application No. PCT/US2022/049248, dated Mar. 10, 2023.

*Primary Examiner* — Paul J Gray
(74) *Attorney, Agent, or Firm* — Stites & Harbison, PLLC; David W. Nagle, Jr.; Gary N. Stewart

(57) ABSTRACT

A system for preventing debris buildup in vacuum sensor lines includes: a manifold, including a positive air pressure source and a controller; and one or more positive air pressure lines. Each positive air pressure line is in fluid communication with the manifold and can be placed in fluid communication with a vacuum sensor line. The controller is operably connected to and selectively activates the positive air pressure source to emit a positive flow of air, which can be directed into the one or more positive air pressure lines, and then into and through the associated vacuum sensor lines to evacuate debris. In some embodiments, a positive flow of air can also be directed through one or more vacuum lines of the end effector to promote the release of a parcel engaged with the end effector and/or clear the vacuum lines of debris.

6 Claims, 5 Drawing Sheets

(56) References Cited

U.S. PATENT DOCUMENTS

| | | |
|---|---|---|
| 2021/0016456 A1 | 1/2021 | Lei et al. |
| 2021/0046513 A1 | 2/2021 | McCoy, Jr. et al. |
| 2021/0221002 A1 | 7/2021 | Bader et al. |
| 2021/0237260 A1* | 8/2021 | Holopainen ....... G05B 19/4182 |
| 2021/0395023 A1 | 12/2021 | Patil et al. |

* cited by examiner

SYSTEM AND METHOD FOR PREVENTING DEBRIS BUILDUP IN VACUUM SENSOR LINES

CROSS-REFERENCE TO RELATED APPLICATION

The present application claims priority to U.S. patent application Ser. No. 63/278,295 filed on Nov. 11, 2021, the entire disclosure of which is incorporated herein by reference.

BACKGROUND OF THE INVENTION

The present invention relates to the handling of parcels within a sorting or similar facility.

In a sorting facility for parcels, various parcels are unloaded from trucks or other vehicles at unloading locations, sorted, and then loaded onto trucks or other vehicles at loading locations for delivery to the intended recipients. Thus, within the sorting facility, there is often a complex system of conveyors and equipment that facilitates transport and sorting of the parcels within the facility. One such piece of equipment useful for sorting the various parcels is a robot singulator including a robotic framework (comprised of one or more arms) and an end effector, such as a vacuum-based end effector, that is mounted to the distal end of the robotic framework and configured to engage parcels. In this regard, a number of different robot singulators exist in the art, one of which is disclosed in commonly assigned U.S. Pat. Nos. 10,646,898 and 10,994,309, which are incorporated herein by reference.

To engage and transport parcels, vacuum-based end effectors commonly include one or more vacuum cups that provide a suction force sufficient to grasp and hold a target parcel when placed in fluid communication with a vacuum source. To detect pneumatic engagement with a parcel, each vacuum cup of the end effector can be operably connected to a vacuum sensor that is configured to provide vacuum pressure feedback indicative of whether the vacuum cup has pneumatically engaged with the parcel, as disclosed, for example, in commonly assigned U.S. Patent Application Publication No. 2020/0262069, which is incorporated herein by reference.

To operably connect the vacuum cups of the end effector and corresponding vacuum sensors, the end effector will typically include one or more ports, with each port corresponding to one of the vacuum cups of the end effector. A vacuum sensor line is then provided for each port to connect the port with a vacuum sensor, thereby placing the vacuum sensor in fluid communication with the vacuum cup corresponding to the port. As a flow of air is drawn through a vacuum cup, a certain degree of air is also drawn through the vacuum sensor line connecting the vacuum cup to the vacuum sensor, which is subsequently measured by the vacuum sensor. Such inflow of air can, however, also draw in and introduce dust and other debris into the vacuum sensor line and/or vacuum sensor. Over time, a buildup of dust or other debris can adversely affect the accuracy of the feedback provided by the vacuum sensor.

Accordingly, there is a need for systems and methods which prevent buildup of dust or other debris within vacuum sensor lines utilized with a vacuum-based end effector.

SUMMARY OF THE INVENTION

The present invention is directed to a system and method for preventing debris buildup in vacuum sensor lines.

An exemplary system for preventing debris buildup in vacuum sensor lines (or debris evacuation system) made in accordance with the present invention includes: a manifold, including a positive air pressure source and a controller; and one or more positive air pressure lines, with each positive air pressure line having a proximal end in fluid communication with the manifold and a distal end configured to be placed in fluid communication with a vacuum sensor line, that, in turn, is in fluid communication with a vacuum-based end effector of a robot singulator or similar robot. The controller is operably connected to the positive air pressure source, such that the controller can selectively activate the positive air pressure source to emit a positive flow of air that can be directed into the one or more positive air pressure lines. Positive air pressure directed into the one or more positive air pressure lines is subsequently directed into any vacuum sensor lines in fluid communication therewith, thus evacuating dust or other debris accumulated within such vacuum sensor lines. The debris evacuation system can thus be utilized in this way and on a regular basis to prevent the buildup of debris within vacuum sensor lines in fluid communication with the positive air pressure source, thus, in turn, reducing the risk of such debris adversely affecting the readings obtained by any vacuum sensors corresponding to such vacuum sensor lines.

In some embodiments, the debris evacuation system further includes one or more connectors, where each connector is configured to place a vacuum sensor line in fluid communication with a positive air pressure line of the debris evacuation system and to place such vacuum sensor line in fluid communication with a vacuum sensor. In some embodiments, each connector of the debris evacuation system includes a first end that is configured to engage a proximal end of a vacuum sensor line, a second end that is configured to engage a distal end of a positive air pressure line of the debris evacuation system, and a third end configured to engage a port of the manifold that is in fluid communication with a vacuum sensor.

In some embodiments, the debris evacuation system further includes one or more filters, where each filter is configured to be placed in fluid communication with a vacuum sensor line associated with a vacuum-based end effector, which, in some cases, may also be in fluid communication with a positive air pressure line of the debris evacuation system.

In some embodiments, the manifold further includes one or more valves operably connected to the controller and configured to transition between an open and a closed configuration. In such embodiments, each valve is in fluid communication with the positive air pressure source and the positive air pressure line(s), such that the valve can be transitioned between the open configuration and the closed configuration based on instructions communicated by the controller to regulate airflow from the positive air pressure source to the positive air pressure line(s) with which it is in fluid communication.

The controller of the manifold can be programmed to selectively activate the positive air pressure source at predetermined intervals and/or following events which may promote the entry of debris into vacuum sensor lines in fluid communication with the one or more positive air pressure lines. For instance, in some embodiments, the controller can be configured to activate the positive air pressure source to emit a positive flow of air simultaneously with the release of a parcel from the vacuum-based end effector.

In some embodiments, the manifold may further include a vacuum source to which one or more vacuum lines in fluid communication with the vacuum-based end effector can be placed in fluid communication with. In one such embodiment, the manifold further includes a valve that is configured to transition between a first configuration to permit a negative flow of air to be drawn through the one or more vacuum lines while the vacuum source is activated and a second configuration to permit a positive flow of air emitted from the positive air pressure source to be directed into the one or more vacuum lines. In use, the valve can thus be selectively transitioned from the first configuration to the second configuration and the positive pressure source activated to direct a positive flow of air through the vacuum line(s) to promote the release of (or "blow off") a parcel engaged with the vacuum-based end effector and/or clear the vacuum line(s) of debris present therein. In some implementations, a positive flow of air may be directed into both the vacuum sensor line(s) and vacuum line(s) simultaneously to prevent debris expelled from vacuum line(s) from being pushed back into the vacuum sensor line(s).

The debris evacuation system can be utilized in combination with a robot singulator or similar robot with a vacuum-based end effector and one or more vacuum sensor lines.

A method for preventing debris build up in one or more vacuum sensor lines is also disclosed herein.

DETAILED DESCRIPTION OF THE INVENTION

The present invention is a system and method for preventing debris buildup in vacuum sensor lines.

Figure 1:
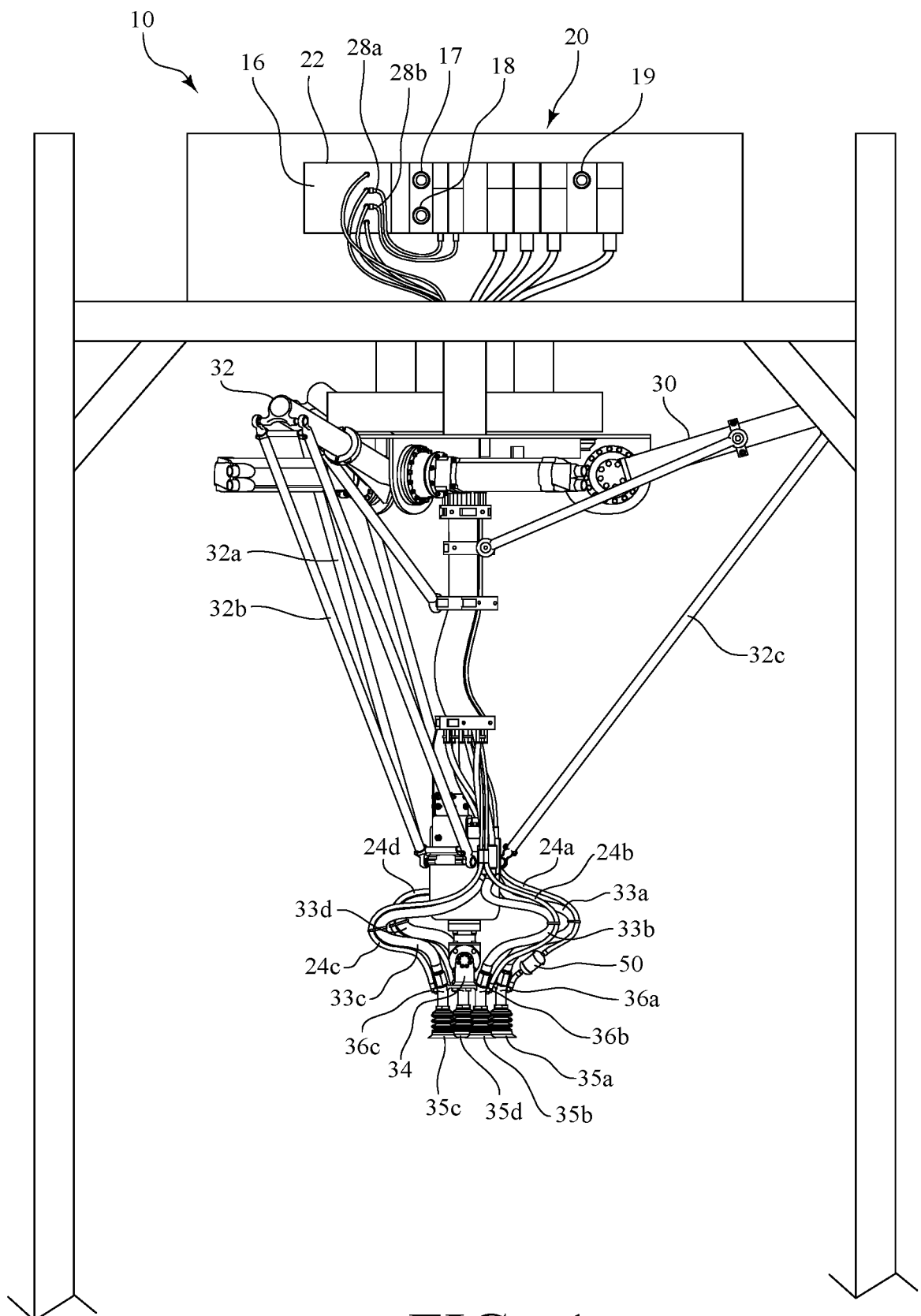
FIG. 1 is a side view of a parcel handling system, including an exemplary system for preventing debris buildup in vacuum sensor lines (or debris evacuation system) made in accordance with the present invention.

FIG. 1 is a side view of a parcel handling system 10, including an exemplary system for preventing debris buildup in vacuum sensor lines (or debris evacuation system) 20 made in accordance with the present invention. In this example, the parcel handling system 10 is for the singulation of parcels, and the debris evacuation system 20 is operably connected to a robot singulator 30. Furthermore, because the exemplary debris evacuation system 20 is a component of the parcel handling system 10, it may also be characterized as a "subsystem."

Figure 2:
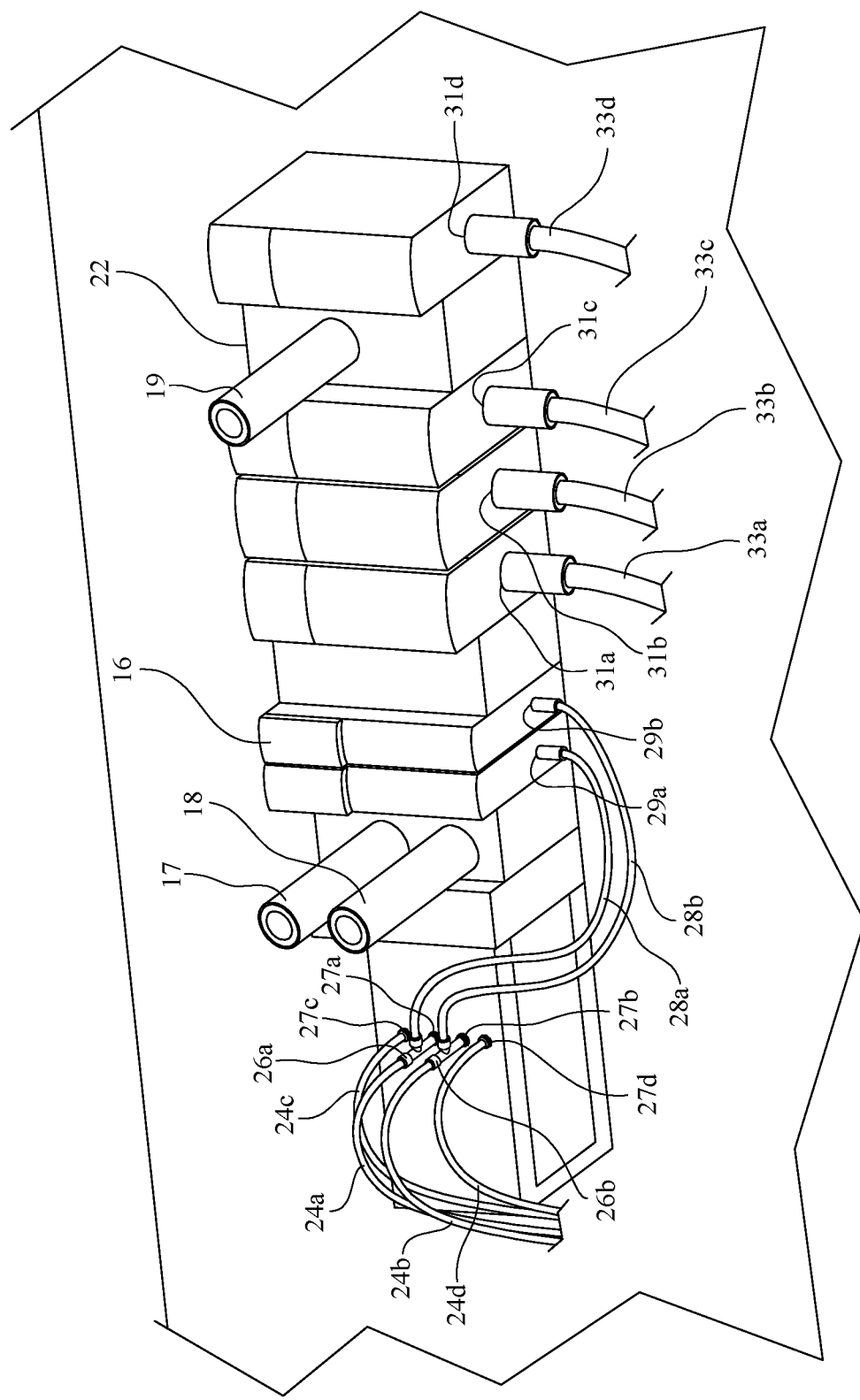
FIG. 2 is a partial perspective view of the exemplary debris evacuation system of FIG. 1.
Figure 3:
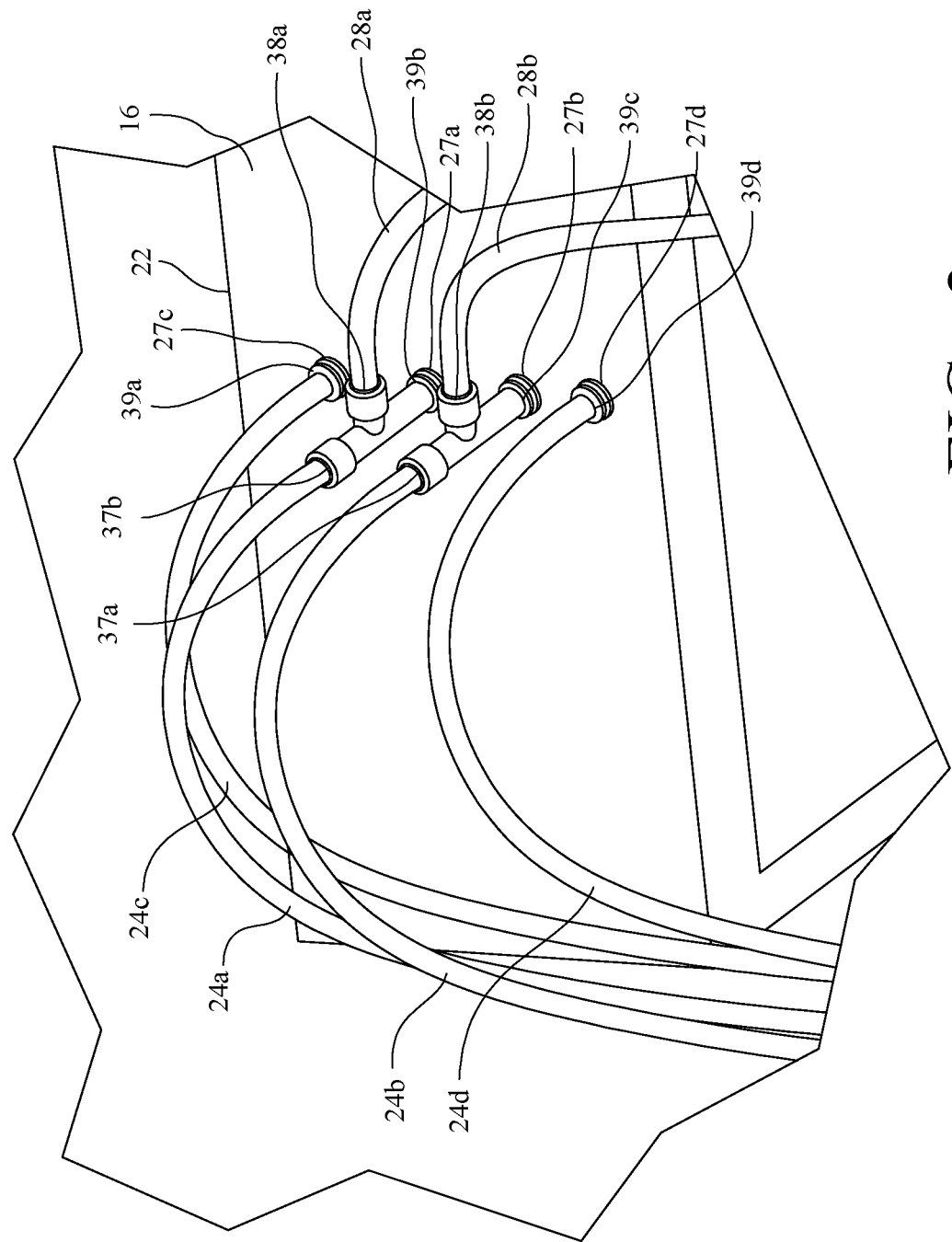
FIG. 3 is another partial perspective view of the exemplary debris evacuation system of FIG. 1.
Figure 5:
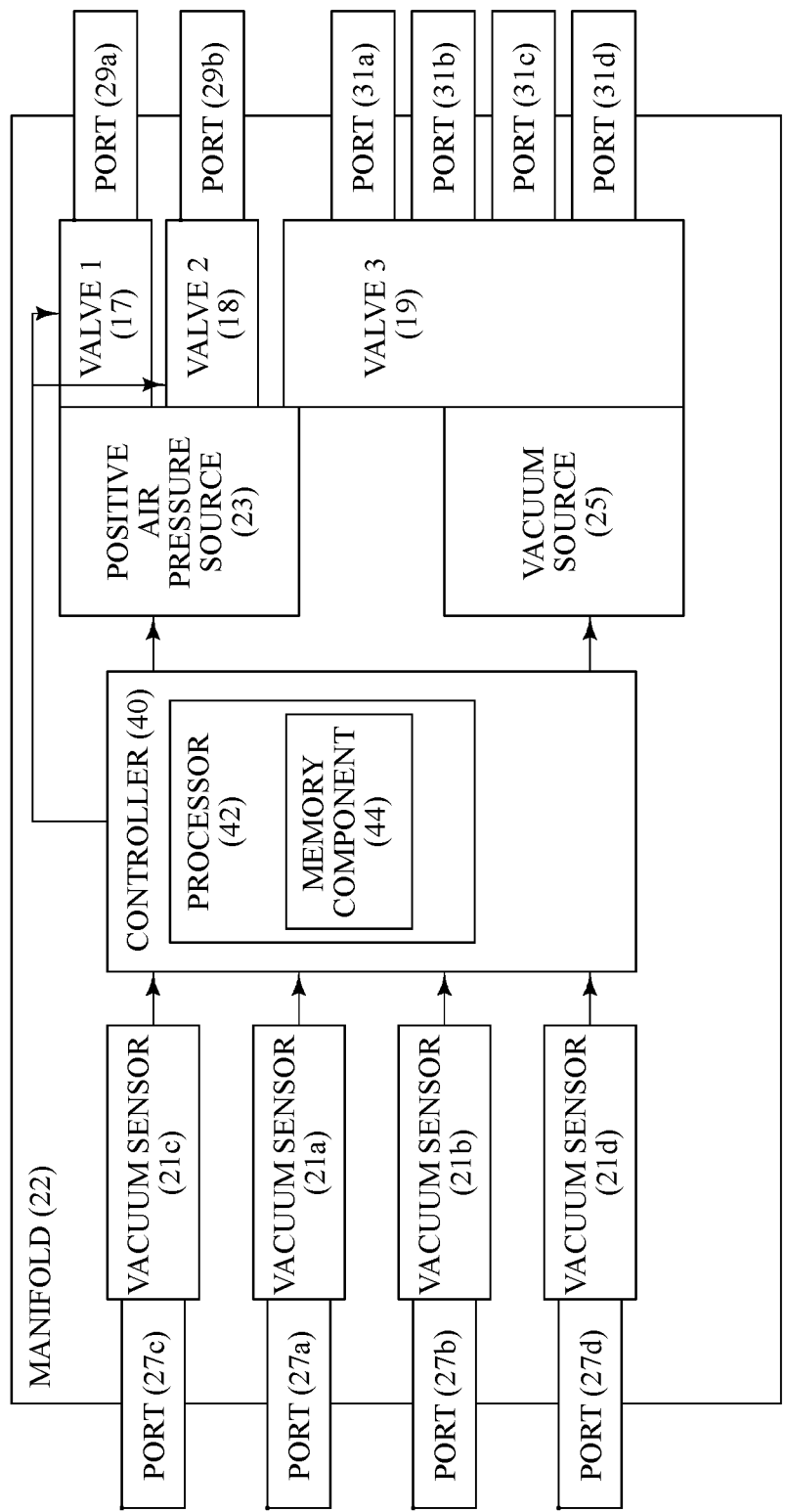
FIG. 5 is a schematic diagram of a manifold of the exemplary debris evacuation system of FIG. 1.

FIGS. 2 and 3 are partial perspective views of the exemplary debris evacuation system 20, and FIG. 5 is a schematic diagram of a manifold of the exemplary debris evacuation system 20.

Referring now to FIGS. 1-3 and 5, the parcel handling system 10 generally includes: a robot singulator (or robot) 30 with a vacuum-based end effector (or end effector) 34 for engaging parcels with one or more vacuum cups 35a, 35b, 35c, 35d mounted on the end effector 34; one or more vacuum lines 33a, 33b, 33c, 33d, which place the one or more vacuum cups 35a, 35b, 35c, 35d in fluid communication with a vacuum source 25 that is configured to draw air through the vacuum lines 33a, 33b, 33c, 33d; one or more vacuum sensor lines 24a, 24b, 24c, 24d, which place the end effector 34 in fluid communication with one or more vacuum sensors 21a, 21b, 21c, 21d; and the debris evacuation system 20. The debris evacuation system 20 includes: a manifold 22, including a positive air pressure source 23 and a controller 40; and one or more positive air pressure lines 28a, 28b. In this example, the debris evacuation system 20 is described as including only two positive air pressure lines 28a, 28b in fluid communication with two vacuum sensor lines 24a, 24b, but, as should become clear in the description that follows, in most embodiments, it is expected that a positive pressure air pressure line would be associated and in fluid communication with each vacuum sensor line.

Referring now to FIGS. 1-3 and 5, the controller 40 is operably connected to the positive air pressure source 23, such that the controller 40 can selectively communicate instructions (signals) which activate the positive air pressure source 23 to emit a positive flow of air. Each positive air pressure line 28a, 28b has a proximal end that is in fluid communication with the positive air pressure source 23 and a distal end in fluid communication with one of the one or more vacuum sensor lines 24a, 24b. In this regard, each positive air pressure line 28a, 28b thus defines a pathway through which the positive flow of air emitted by the positive air pressure source 23 can travel from manifold 22 into the vacuum sensor line 24a, 24b with which the positive air pressure line 28a, 28b is in fluid communication. The positive air entering the vacuum sensor line 24a, 24b forces dust or other debris out of the vacuum sensor line 24a, 24b. The controller 40 can be programmed to selectively activate the positive air pressure source 23 at predetermined time intervals while the debris evacuation system 20 is in use and/or following events which may promote the entry of debris into the one or more vacuum sensor lines 24a, 24b, such as the end effector 34 engaging and releasing a target parcel. In this way, the debris evacuation system 20 of the present invention can thus be utilized to prevent the buildup of debris within one or more of the vacuum sensor lines 24a, 24b, 24c, 24d of the larger parcel handling system 10, and the risk of such debris adversely affecting the vacuum sensors 21a, 21b, 21c, 21d corresponding to such vacuum sensor lines 24a, 24b, 24c, 24d.

Figure 4:
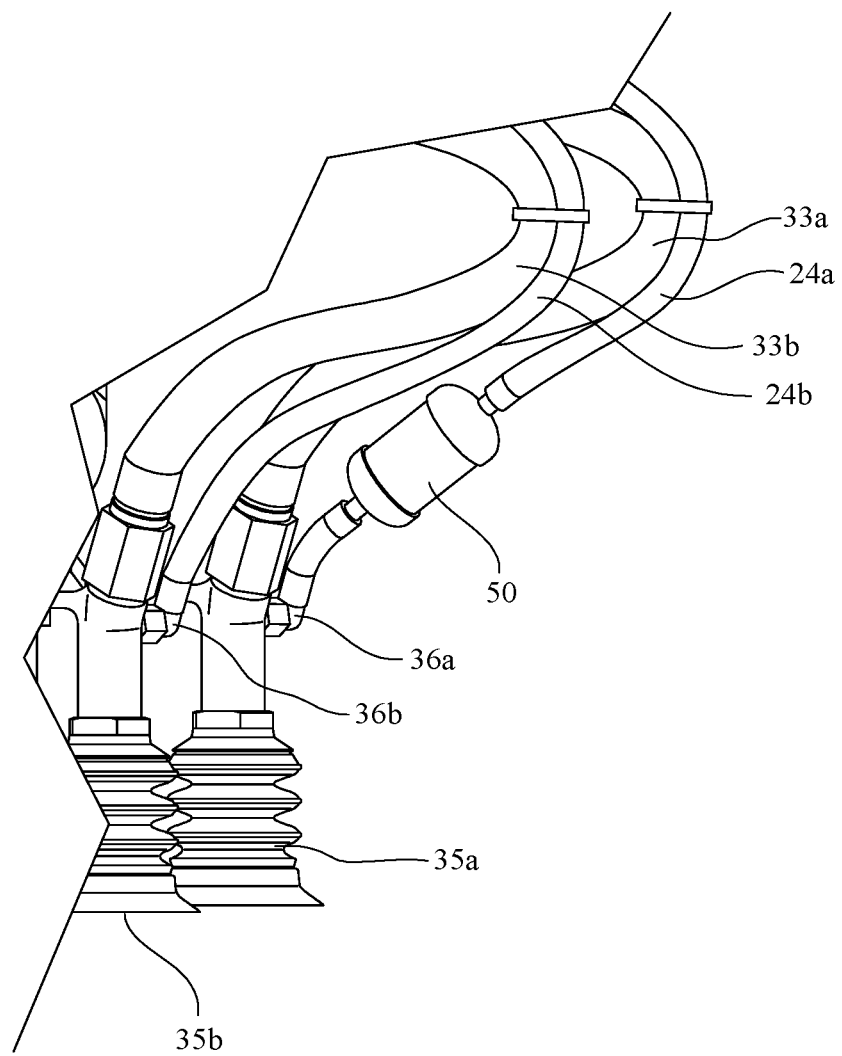
FIG. 4 is a partial side view of certain components of the parcel handling system and the exemplary debris evacuation system of FIG. 1.

FIG. 4 is a partial side view of the end effector 34 of the robot singulator 30 and a filter 50, which, in this exemplary embodiment, is also a component of the debris evacuation system 20.

Referring now to FIGS. 1-5, in this exemplary embodiment, the robot singulator 30 includes the end effector 34 and a robotic framework 32 to which the end effector 34 is mounted. Although not shown, it is appreciated that the robot singulator 30 will also typically include one or more cables, which extend from the robotic framework 32 and/or the end effector 34, and which are operably connected to various source components, e.g., a power source (not shown) and a signal source (not shown). As noted above, in this exemplary embodiment, the end effector 34 is a vacuum-based end effector and, as such, includes one or more vacuum cups 35a, 35b, 35c, 35d for engaging parcels. In this exemplary embodiment, there are four such vacuum cups 35a, 35b, 35c, 35d: a first vacuum cup 35a, which is placed in fluid communication with the vacuum source 25 via a first vacuum line 33a; a second vacuum cup 35b, which is placed in fluid communication with the vacuum source 25 via a second vacuum line 33b; a third vacuum cup 35c, which is placed in fluid communication with the vacuum source 25 via a third vacuum line 33c; and a fourth vacuum cup 35d, which is placed in fluid communication with the vacuum source 25 via a fourth vacuum line 33d. The vacuum source 25 can be selectively activated to provide each vacuum cups 35a, 35b, 35c, 35d with a suction force sufficient to engage and hold a parcel as it is transported from one location to another by the robot singulator 30. As shown in FIGS. 1 and 4, the end effector 34 also includes a sensor port 36a, 36b, 36c (three of which are visible in FIG. 1). Each vacuum sensor port 36a, 36b, 36c is in fluid communication with the vacuum cup 35a, 35b, 35c, 35d to which it corresponds and is configured to connect to a respective vacuum sensor line 24a, 24b, 24c, 24d, which, in turn, is in fluid communication with a respective vacuum sensor 21a, 21b, 21c, 21d (FIG. 5), as further described below. For the vacuum sensor lines 24a, 24b in fluid communication with a positive air pressure line 28a, 28b, the sensor port 36a, 36b corresponding to the vacuum sensor line 24a, 24b provides an outlet through which debris present in the vacuum sensor line 24a, 24b can be expelled through the vacuum cups 35a, 35b corresponding to the vacuum sensor line 24a, 24b. Suitable end effectors which may be utilized in the present invention include, but are not limited to, those described in U.S. Patent Application Publication No. 2020/0262069 and U.S. Patent Application Publication No. 2021/0221002, both of which are incorporated herein by reference.

Referring now to FIGS. 1-4, the vacuum lines 33a, 33b, 33c, 33d, vacuum senor lines 24a, 24b, 24c, 24d, and positive air pressure lines 28a, 28b referred to herein are preferably constructed of a flexible vacuum tubing, which is known and commonly utilized within the art.

Referring now to FIGS. 1 and 5, in this exemplary embodiment, the robotic framework 32 includes a first arm 32a, a second arm 32b, and a third arm 32c that can be selectively activated to move the end effector 34. The robotic framework 32 thus provides multiple degrees of freedom, thus enabling the robotic framework 32 to be positioned in the manner necessary for the end effector 34 to engage a target parcel. One suitable robot singulator 30 for use in the present invention is a Delta 3 P6 robot manufactured by Schneider Electric and available, for instance, from Advantage Industrial Automation of Duluth, Georgia. In some embodiments, the selection of parcels for engagement with the end effector 34, movement of the respective components of the robotic framework 32, and actuation of the end effector 34 may be regulated by a vision and control subsystem (not shown), such as that disclosed in commonly assigned U.S. Patent Application Publication No. 2021/0221002, U.S. Patent Application Publication No. 2021/0395023, U.S. Pat. Nos. 10,646,898, and 10,994,309, each of which is incorporated herein by reference.

Referring now specifically to FIG. 5, in addition to the positive air pressure source 23 and the controller 40, in this exemplary embodiment, the manifold 22 also includes the vacuum sensors 21a, 21b, 21c, 21d (and, in this case, there are four such sensors), and the vacuum source 25 of the parcel handling system 10. Each vacuum sensor 21a, 21b, 21c, 21d corresponds to one of the vacuum cups 35a, 35b, 35c, 35d of the end effector 34 and is configured to obtain readings indicative of the pneumatic engagement or non-engagement of the vacuum cup to which it corresponds with a parcel. As shown, each vacuum sensor 21a, 21b, 21c, 21d is operably connected to the controller 40, such that readings obtained by the vacuum sensors 21a, 21b, 21c, 21d are communicated to the controller 40 for subsequent processing. The proximity between the positive air pressure source 23 and the vacuum source 25 in this exemplary embodiment within the manifold 22 is advantageous as it permits a single valve 19 to regulate both positive airflow (positive air pressure) into the vacuum sensor lines 24a, 24b in fluid communication with the positive air pressure source 23 and negative airflow (negative air pressure) through the vacuum lines 33a, 33b, 33c, 33d in fluid communication with the vacuum source 25, as further described below. It should be appreciated, however, that, while offering certain advantages and benefits, the proximity of the positive air pressure source 23 and the vacuum source 25 is not critical to the central functionality of the debris evacuation system 20. Similarly, while the proximity of the vacuum sensors 21a, 21b, 21c, 21d to the controller 40 may offer some advantages, the proximity of the vacuum sensors 21a, 21b, 21c, 21d to the controller 40 is also not critical to the central functionality of the debris evacuation system 20. Accordingly, embodiments are contemplated herein in which the vacuum sensors 21a, 21b, 21c, 21d and/or the vacuum source 25 are not components of the manifold 22 and are positioned elsewhere within the parcel handling system 10.

Referring still to FIG. 5, the controller 40 includes a processor 42 which executes instructions (routines) stored in a memory component 44 or other computer-readable medium to perform the various operations of the controller 40 described herein. Accordingly, it should be appreciated that each operation described herein for the controller 40 corresponds to a set of instructions stored in the memory component 44, which, when executed by the processor 42, cause the controller 40 to perform the stated operation, unless otherwise specified. As shown, the controller 40 is operably connected to the positive air pressure source 23 and the vacuum source 25, such that the controller 40 can communicate instructions (signals) to selectively activate the positive air pressure source 23 to emit a positive flow of air and can communicate instructions (signals) to selectively activate the vacuum source 25 to provide each vacuum cup 35a, 35b, 35c, 35d with a suction force sufficient to engage and hold a parcel as it is transported from one location to another.

Referring now to FIGS. 1-3 and 5, the manifold 22 includes a housing 16 in which the components of the manifold 22 are housed. In this exemplary embodiment, the housing 16 is actually comprised of multiple housings located in close proximity to each other. To facilitate the inflow of air to each vacuum sensor 21a, 21b, 21c, 21d, in this exemplary embodiment, the manifold 22 includes a vacuum sensor port 27a, 27b, 27c, 27d for each vacuum sensor 21a, 21b, 21c, 21d. In this exemplary embodiment, each vacuum sensor port 27a, 27b, 27c, 27d is defined, at least in part, by the housing 16 of the manifold 22 and is configured to connect and place one of the vacuum sensor lines 24a, 24b, 24c, 24d in fluid communication with the vacuum sensor 21a, 21b, 21c, 21d to which the vacuum sensor port 27a, 27b, 27c, 27d corresponds. Similarly, to facilitate the drawing of air through each vacuum line 33a, 33b, 33c, 33d, in this exemplary embodiment, the manifold 22 further includes a vacuum port 31a, 31b, 31c, 31d for each of the vacuum lines 33a, 33b, 33c, 33d. In this exemplary embodiment, each vacuum port 31a, 31b, 31c, 31d is defined, at least in part, by the housing 16 of the manifold 22 and is configured to connect and place one of the vacuum lines 33a, 33b, 33c, 33d in fluid communication with the vacuum source 25 and the positive air pressure source 23, or an intermediate component in fluid communication with the vacuum source 25 and the positive air pressure source 23, as further described below.

Referring still to FIGS. 1-3, and 5, in this exemplary embodiment and as noted above, the debris evacuation system 20 includes two positive air pressure lines: a first positive air pressure line 28a; and a second positive air pressure line 28b. Again, in this example, the debris evacuation system 20 is described as including only two positive air pressure lines 28a, 28b in fluid communication with two vacuum sensor lines 24a, 24b, but, in most embodiments, a positive pressure air pressure line would be associated with and in fluid communication with each vacuum sensor line. The proximal end of the first positive air pressure line 28a and the proximal end of the second positive air pressure line 28b are each placed in fluid communication with the positive air pressure source 23. To this end, the manifold 22 also includes a first positive air flow port 29a corresponding to the first positive air pressure line 28a and a second positive air flow port 29b corresponding to the second positive air pressure line 28b. In this exemplary embodiment, the first positive air flow port 29a and the second positive air flow port 29b are each defined, at least in part, by the housing 16 of the manifold 22 and are each configured to place the proximal end of the first positive air pressure line 28a and the second positive air pressure line 28b, respectively, in fluid communication with the positive air pressure source 23 or an intermediate component that is in fluid communication with the positive air pressure source 23, such as the first valve 17 and the second valve 18 described below. In alternative embodiments, instead of multiple valves regulating the flow of positive air from the positive air pressure source 23 to the first positive airflow port 29a and the second positive airflow port 29b, a single valve may be utilized.

Referring still to FIGS. 1-3 and 5, in this exemplary embodiment, the manifold 22 further includes a first valve 17 and a second valve 18 which regulate the positive airflow provided by the positive air pressure source 23 to the first positive air flow port 29a and the second positive air flow port 29b, respectively, and thus the positive air pressure lines 28a, 28b in fluid communication therewith. In this regard, the first valve 17 and the second valve 18 are each configured to transition between an open configuration to permit the positive airflow from the positive air pressure source 23 to be directed through the first positive air flow port 29a and the second positive air flow port 29b, respectively. Accordingly, the first valve 17 and the second valve 18 are in fluid communication with both the vacuum source 25 and one of the positive air pressure lines 28a, 28b corresponding to the positive air flow ports 29a, 29b. In the closed configuration, the first valve 17 and the second valve 18 block any airflow from the positive air pressure source 23 to the first positive air pressure line 28a and the second positive air pressure line 28b, respectively. Conversely, airflow from the positive air pressure source 23 is permitted to pass into the first positive air pressure line 28a and the second positive air pressure line 28b when the first valve 17 and the second valve 18, respectively, are in the open configuration. In this exemplary embodiment, the transition of the first valve 17 and the second valve 18 between the open configuration and the closed configuration is regulated by the controller 40. To this end, and in this exemplary embodiment, the first valve 17 and the second valve 18 are solenoid valves that are operably connected to the controller 40, such that the controller 40 can selectively communicate instructions (signals) to transition each of the first valve 17 and the second valve 18 between the open configuration and the closed configuration.

Referring still to FIGS. 1-3 and 5, in this exemplary embodiment, in addition to preventing debris buildup within vacuum sensor lines 24a, 24b, the debris evacuation system 20 can also be utilized to direct airflow from the positive air pressure source 23 into the vacuum lines 33a, 33b, 33c, 33d to promote the release of (or "blow off") a parcel engaged with one or more vacuum cups 35a, 35b, 35c, 35d of the end effector 34 and/or clear the vacuum lines 33a, 33b, 33c, 33d of debris present therein. To this end, and in this exemplary embodiment, the manifold 22 also includes a third valve 19, which is in fluid communication with the positive air pressure source 23, the vacuum source 25, and the vacuum ports 31a, 31b, 31c, 31d. The third valve 19 is also configured to transition between a first configuration and a second configuration. In the first configuration, the third valve 19 permits a flow of air to be drawn through the vacuum cups 35a, 35b, 35c, 35d and corresponding vacuum lines 33a, 33b, 33c, 33d while the vacuum source 25 is activated to draw a vacuum, but blocks any flow or air generated by the positive air pressure source 23. In the second configuration, the third valve 19 permits a positive flow of air to be expelled through the vacuum lines 33a, 33b, 33c, 33d and corresponding vacuum cups 35a, 35b, 35c, 35d when the positive air pressure source 23 is activated to emit a flow of air, but blocks any flow of air generated by the vacuum source 25. In this exemplary embodiment, the transition of the third valve 19 between the first configuration and the second configuration is also regulated by the controller 40. To this end, in this exemplary embodiment, the third valve 19 is a solenoid valve that is operably connected to the controller 40, such that the controller 40 can selectively communicate instructions (signals) which cause the third valve to transition between the first configuration and the second configuration. The controller 40 can thus communicate instructions to the positive air pressure source 23, the vacuum source 25, and the third valve 19 to regulate whether a vacuum is drawn or a positive air pressure is provided through each of the vacuum lines 33a, 33b, 33c, 33d and corresponding vacuum cups 35a, 35b, 35c, 35d at a given time. Although represented in the drawings as a single valve, embodiments, are contemplated, in which multiple valves are used to regulate the drawing of a vacuum and application of a positive air pressure through the vacuum cups 35a, 35b, 35c, 35d and corresponding vacuum lines 33a, 33b, 33c, 33d. Furthermore, embodiments are contemplated in which the debris evacuation system 20 includes one or more valves for each respective vacuum cup 35a, 35b, 35c, 35d, such that each vacuum cup 35a, 35b, 35c, 35d can independently draw a vacuum or be provided with positive air pressure.

Referring now again to FIGS. 1-5, the distal end of each vacuum sensor line 24a, 24b, 24c, 24d is placed in fluid communication with one of the vacuum sensor ports 36a, 36b, 36c of the end effector 34, while the proximal end of each vacuum sensor line 24a, 24b, 24c, 24d is placed in fluid communication with one of the vacuum sensor ports 27a, 27b, 27c, 27d of the manifold 22, either directly or indirectly. In this exemplary embodiment, the debris evacuation system 20 further includes one or more connectors 26a, 26b, where each connector is configured to connect and place one of the positive air pressure lines 28a, 28b in fluid communication with one of the vacuum sensor lines 24a, 24b. The number of connectors 26a, 26b corresponds to the number of positive air pressure lines 28a, 28b in use. Accordingly, in this exemplary embodiment, there are two connectors: a first connector 26a, which is configured to connect and place the distal end of the first positive air pressure line 28a in fluid communication with a proximal end of a first vacuum sensor line 24a; and a second connector 26b, which is configured to connect and place the distal end of the second positive air pressure line 28b in fluid communication with a proximal end of a second vacuum sensor line 24b. The first connector 26a and the second connector 26b are also configured, respectively, to connect the vacuum sensor lines 24a, 24b and the positive air pressure line 28a, 28b to one of the vacuum sensor ports 27a, 27b of the manifold 22. In this exemplary embodiment, the first connector 26a and the second connector 26b are both tee connectors. In this exemplary embodiment, the first connector 26a thus includes: a first end that is configured to engage the proximal end of the first vacuum sensor line 24a; a second end that is configured to engage the distal end of the first positive air pressure line 28a; and a third end that is configured to engage the first vacuum sensor port 27a, which is in fluid communication with the first vacuum sensor 21a. The second connector 26b similarly includes: a first end that is configured to engage the proximal end of the second vacuum sensor line 24b; a second end that is configured to engage the distal end of the second positive air pressure line 28b; and a third end that is configured to engage the second vacuum sensor port 27b, which is in fluid communication with the second vacuum sensor 21b. In this exemplary embodiment, the first end and the second end of each connector 26a, 26b defines a port in which the proximal end of the vacuum sensor line 24a, 24b and the distal end of the positive air pressure line 28a, 28b in which the connector 26a, 26b is received, and the third end of each connector 26a, 26b is a male member that is configured to be inserted into the vacuum sensor port 27a, 27b to which the connector 26a, 26b corresponds. It should be appreciated, however, that alternative connectors suitable for connecting the first vacuum sensor line 24a and the second vacuum sensor line 24b to the first positive air pressure line 28a and the second positive air pressure line 28b as well as the first vacuum sensor port 27a and the second vacuum sensor port 27b in the manner described above can alternatively be used without departing from the spirit or scope of the present invention.

Referring now specifically to FIG. 3, in instances where the diameter of the vacuum sensor lines 24a, 24b and/or positive air pressure lines 28a, 28b do not correspond with the diameter of the ports defined by the first end and the second end of the connectors 26a, 26b, respectively, as to provide a substantially airtight connection, intermediate adapters 37a, 37b, 38a, 38b may be utilized to connect the connectors 26a, 26b to the corresponding vacuum sensor lines 24a, 24b and positive air pressure lines 28a, 28b. Similarly, in instances where the diameter of the vacuum sensor lines 24c, 24d directly connected to the vacuum sensor ports 27c, 27d and/or the diameter of the male member defined by the third end of the connectors 26a, 26b does not correspond with the diameter of the vacuum sensor ports 27a, 27b, 27c, 27d in which they are inserted, intermediate adapters 39a, 39b, 39c, 39d can also be utilized.

Referring now to FIGS. 1 and 4, in this exemplary embodiment, the debris evacuation system 20 further includes a filter 50 that is configured to collect dust or other debris carried by air passed therethrough. In this exemplary embodiment, the filter 50 is provided on and is in fluid communication with the distal end of one of the vacuum sensor lines 24a that, in turn, is in fluid communication with one of the positive air pressure lines 28a. The filter 50 is thus also positioned upstream of the vacuum sensor 21a with which the vacuum sensor line 24a is in fluid communication. Alternative embodiments are, however, contemplated in which the filter 50 is provided on a vacuum sensor line which is directly connected to the manifold 22 (i.e., not in fluid communication with a positive air pressure line 28a, 28b) as well as embodiments in which the filter 50 is alternatively positioned (e.g., near the proximal end of a vacuum sensor line). In this example, the debris evacuation system 20 is described as including only a single filter 50 in fluid communication with one of the vacuum sensor lines 24a, but, as should be clear from the description provided herein, in most embodiments, it is expected that each vacuum sensor 24a, 24b, 24c, 24d would be associated and in fluid communication with a filter. Accordingly, embodiments in which the debris evacuation system 20 includes multiple filters are also contemplated herein. One suitable filter 50 for use in the present invention is a filter selected from the ZFC In-line Air Filter series manufactured by SMC Corporation and available, for instance, from OTP Industrial Solutions of Louisville, Kentucky.

Referring now to FIGS. 1, 4, and 5, while the parcel handling system 10 is in use, the robotic framework 32 is moved as to place the one or more vacuum cups 35a, 35b, 35c, 35d of the end effector 34 into engagement with a target parcel (not shown). Upon or prior to such engagement, the controller 40 communicates instructions which activate the vacuum source 25 to draw a vacuum. At such time, and if the third valve 19 is not already in the first configuration, the controller 40 will also communicate instructions which cause the third valve 19 to transition from the second configuration to the first configuration to permit air to be drawn through the vacuum cups 35a, 35b, 35c, 35d and corresponding vacuum lines 33a, 33b, 33c, 33d, so that the end effector 34 can apply a suction force sufficient to lift and hold the target parcel. Upon reaching the intended destination where the target parcel is to be delivered, the target parcel is released from the end effector 34. In this regard, release of the target parcel may be effectuated by virtue of the controller 40 communicating instructions which deactivate the vacuum source 25 (i.e., cause the vacuum source 25 to stop drawing a negative flow of air through one or more of the vacuum cups 35a, 35b, 35c, 35d with which the target parcel is engaged), thereby removing the suction force holding the target parcel in association with the end effector 34. In some implementations, in addition (or even as an alternative) to the deactivation of the vacuum source 25, the controller 40 may communicate instructions which activate the positive air pressure source and cause the third valve 19 to transition to the second configuration, resulting in a positive flow of air being directed through the vacuum lines 33a, 33b, 33c, 33d and into the corresponding vacuum cups 35a, 35b, 35c, 35d. The introduction of the positive flow of air resulting from the activation of the positive air pressure source 23 quickly returns the vacuum cups 35a, 35b, 35c, 35d to normal atmospheric pressure, effectively "blowing" the target parcel off of the end effector 34.

Referring now again to FIGS. 1-5, following, or simultaneously with, the release of the target parcel, the controller 40 communicates instructions which places the first valve 17 and the second valve 18 in the open configuration and activate the positive air pressure source 23 to direct a flow of air into the positive air pressure lines 28a, 28b, which is subsequently directed through the connectors 26a, 26b, and through the vacuum sensor lines 24a, 24b in fluid communication therewith, thus promoting evacuation of dust or other debris from such vacuum sensor lines 24a, 24b and the filter 50. To better ensure the accuracy of each reading obtained by the vacuum sensors 21b, 21c corresponding to the vacuum sensor lines 24a, 24b in fluid communication with positive air pressure lines 28a, 28b, it is generally preferred that the controller 40 selectively activate the positive air pressure source 23, and that the first valve 17 and the second valve 18 be placed or remain in the open configuration, each time a parcel is delivered to its intended destination. Furthermore, to avoid potential downtime between the robot singulator 30 delivering one parcel and engaging another parcel it is generally preferred that the controller 40 selectively activate the positive air pressure source 23, and, if needed, communicate instructions which cause the first valve 17 and the second valve 18 to transition from the closed position to the open position, simultaneously or substantially simultaneously with the release of a parcel, especially in instances where positive air pressure is directed to the vacuum cups 35a, 35b, 35c, 35d to promote the release of (or "blow off") a parcel from the end effector 34. The expulsion of air through the vacuum sensor lines 24a, 24b, when occurring at the same time as positive air pressure is directed through the vacuum lines 33a, 33b, 33c, 33d and corresponding vacuum cups 35a, 35b, 35c, 35d to release the parcel, prevents the positive air pressure directed through the vacuum cups 35a, 35b, 35c, 35d from pushing debris back into the vacuum sensor lines 24a, 24b. Once, the vacuum sensor lines 24a, 24b have been cleared of debris by virtue of the positive air pressure generated by the positive air pressure source 23 passing therethrough, the above-described process can be repeated to engage and transfer additional parcels while guarding against debris build up.

It should be appreciated that the controller 40 can be alternatively programmed (via instructions stored in the memory component 44) to evacuate debris from the vacuum sensor lines 24a, 24b in fluid communication with the positive air pressure source 23 at times and/or upon the occurrence of events which differ from that of the preferred implementation described above. For instance, in some implementations, the controller 40 may be configured to communicate instructions which cause the debris evacuation system 20 to evacuate debris from the vacuum sensor lines 24a, 24b in fluid communication with the positive air pressure source 23 at predetermined time intervals while the parcel handling system 10 is in use. In such implementations, if a predetermined time for evacuation coincides with a time in which the end effector 34 is engaged with and is transferring a parcel, the evacuation of the vacuum sensor lines 24a, 24b in fluid communication with the positive air pressure source 23 may be delayed until the parcel has been released from the end effector 34. In other implementations, the controller 40 may be configured to communicate instructions which cause the debris evacuation system 20 to evacuate the debris from such vacuum sensor lines 24a, 24b soon after the parcel handling system 10 is initialized for use.

Although the debris evacuation system 20 is described herein as including only two positive air pressure lines 28a, 28b, as noted above, in most embodiments, each vacuum sensor line 24a, 24b, 24c, 24d, will be placed in fluid communication with a corresponding connector and positive air pressure line so that the vacuum sensor line 24a, 24b, 24c, 24d corresponding to each vacuum cup 35a, 35b, 35c, 35d of the end effector 34 can be evacuated of dust and other debris in the manner described above. Furthermore, although the debris evacuation system 20 is primarily in the context of being utilized in combination with a parcel handling system, it should be appreciated that the debris evacuation system 20 can be implemented in other systems employing the use of a vacuum-based end effector.

It is appreciated that each operation performed by the parcel handling system 10, and, in particular, the debris evacuation system 20 thereof, can also be characterized as a method step, unless otherwise specified. Accordingly, the present invention is also directed to a method for preventing debris buildup in vacuum sensor lines, in which some or all of the various operations described above and performed by the parcel handling system 10 correspond to a step within the method.

One of ordinary skill in the art will recognize that additional embodiments and implementations are also possible without departing from the teachings of the present invention. This detailed description, and particularly the specific details of the exemplary embodiments and implementations disclosed herein, are given primarily for clarity of understanding, and no unnecessary limitations are to be understood therefrom, for modifications will become obvious to those skilled in the art upon reading this disclosure and may be made without departing from the spirit or scope of the invention.

What is claimed is:

1. A parcel handling system, comprising:
   a robot;
   a vacuum-based end effector mounted to the robot for engaging parcels, including one or more vacuum cups;
   one or more vacuum lines in fluid communication with the one or more vacuum cups;
   one or more vacuum sensor lines in fluid communication with the one or more vacuum cups and with one or more vacuum sensors; and
   a subsystem, including
      one or more positive air pressure lines, each positive air pressure line of the one or more positive air pressure lines having a distal end in fluid communication with one of the one or more vacuum sensor lines, and
      a manifold, including
         a positive air pressure source in fluid communication with the one or more vacuum lines and the one or more positive air pressure lines,
         a vacuum source configured to draw a vacuum and in fluid communication with the one or more vacuum lines,
         a first valve configured to transition between an open configuration and a closed configuration to regulate airflow from the positive air pressure source to the one or more positive air pressure lines,
         a second valve configured to transition between a first configuration to permit a negative flow of air to be drawn through the one or more vacuum lines while the vacuum source is activated and a second configuration to permit a positive flow of air emitted by the positive air pressure source to be directed into the one or more vacuum lines, and
         a controller operably connected to the positive air pressure source, the first valve, and the second valve, with the controller including a processor for executing instructions stored in a memory component to (i) selectively activate the positive air pressure source to emit the positive flow of air, (ii) selectively activate the first valve to transition between the open configuration and the closed configuration, and (iii) selectively activate the second valve to transition between the first configuration and the second configuration.

2. The parcel handling system according to claim 1, wherein the first valve comprises multiple valves.

3. The parcel handling system according to claim 1, wherein the subsystem further includes one or more connectors, each connector of the one or more connectors placing one of the one or more vacuum sensor lines in fluid communication with one of the one or more positive air pressure lines and placing the one of the one or more vacuum sensor lines in fluid communication with one of the one or more vacuum sensors.

4. The parcel handling system according to claim 1, wherein the subsystem further includes one or more filters, each filter of the one or more filters placed in fluid communication with one of the one or more vacuum sensor lines and configured to collect debris carried by air in the vacuum sensor line.

5. The parcel handling system according to claim 1, wherein the memory component further includes instructions, which, when executed by the processor, cause the controller to selectively activate the positive air pressure source to emit the positive flow of air simultaneously with a release of a parcel from the end effector.

6. The parcel handling system according to claim 5, wherein the release of the parcel from the end effector coincides with the positive flow of air being directed into the one or more vacuum cups of the end effector with which the parcel is engaged.

\* \* \* \* \*